(12) United States Patent
Frenger et al.

(10) Patent No.: US 8,626,213 B2
(45) Date of Patent: Jan. 7, 2014

(54) METHOD AND ARRANGEMENT FOR CELL ID COLLISION DETECTION

(75) Inventors: Pal Frenger, Linkoping (SE); Fredrik Gunnarsson, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 333 days.

(21) Appl. No.: 13/060,381

(22) PCT Filed: Aug. 27, 2008

(86) PCT No.: PCT/SE2008/050972
§ 371 (c)(1),
(2), (4) Date: Feb. 23, 2011

(87) PCT Pub. No.: WO2010/024743
PCT Pub. Date: Mar. 4, 2010

(65) Prior Publication Data
US 2011/0159901 A1    Jun. 30, 2011

(51) Int. Cl.
*H04B 7/00* (2006.01)
*H04B 15/00* (2006.01)

(52) U.S. Cl.
USPC ............ 455/501; 455/504; 455/505; 455/506

(58) Field of Classification Search
CPC .................................................... H04L 5/0007
USPC ................ 455/436, 453, 226.1, 63.1, 67.13
See application file for complete search history.

(56) References Cited

U.S. PATENT DOCUMENTS 7,873,051 B2 * 1/2011 Hindelang et al. ............ 370/394
8,340,043 B2 * 12/2012 Suzuki et al. ................. 370/329
2006/0172707 A1 8/2006 Stern-Berkowitz et al.
2009/0047956 A1 * 2/2009 Moe et al. ..................... 455/436
2010/0054203 A1 * 3/2010 Damnjanovic et al. ....... 370/329
2011/0292903 A1 * 12/2011 Jongren et al. ................ 370/329

OTHER PUBLICATIONS

Amirijoo, M. et al. "Neighbor Cell Relation List and Physical Cell Identity Self-Organization in LTE" IEEE International Conference on Communications Workshops, 2008 (ICC Workshops '08), May 19-21, 2008, pp. 37-41.
3RD Generation Partnership Project. "SON Automatic Neighbour Relation Function." 3GPP TSG-RAN WG2 Meeting #61, R2-081141, Sorrento, Italy, Feb. 10-15, 2008.
3RD Generation Partnership Project. "Mechanism for UE Measurements and Reporting of Global Cell Identity." 3GPP TSG-RAN WG2 #61, R2-081046, Sorrento, Italy, Feb. 11-15, 2008.

* cited by examiner

*Primary Examiner* — Tilahun B Gesesse
(74) *Attorney, Agent, or Firm* — Coats and Bennett PLLC (57) ABSTRACT

The present invention relates to methods, a communication network node and a user equipment for detecting collision of physical cell identities in a communication network system comprising radio base stations each serving at least one cell through which user equipments are moving. Reference signals comprising reference symbols corresponding to a physical cell identity are sent from said radio base stations to said user equipments over a radio interface. Transmission gaps of reference symbols are inserted in the reference signal in order to perform a physical cell identity collision test. The user equipments are arranged to detect if any other radio base station is sending reference symbols corresponding to the same physical cell identity during the transmission gaps. Thereby a physical cell identity collision is detected. The reference symbol transmission gaps are fractionally distributed within said reference signal such that at least some of said reference symbols are unaffected by said reference symbol transmission gaps.

22 Claims, 6 Drawing Sheets

METHOD AND ARRANGEMENT FOR CELL ID COLLISION DETECTION

TECHNICAL FIELD

The present invention relates to a method and a communication network node in a communication network system and, more particular, to a communication network node allowing for detecting a physical cell identity collision as well as a method for such detection.

BACKGROUND

Within the $3^{rd}$ generation partnership programme (3GPP) the work of standardizing the first release of the 3G long term evolution (LTE) system has been intense during the recent year.

One important focus area in LTE standardization work is to ensure that the new network is simple to deploy and cost efficient to operate. The vision is that the new system shall be self optimizing and self configuring in as many aspects as possible. Two related such aspects are automatic assignment of physical cell identities (PCIDs) and automatic construction of neighbour cell relation (NCR) lists.

A PCID is a short identity that is locally unique in the vicinity of the cell. In LTE there are 504 unique such identities defined in the standard and consequently the PCIDs need to be reused in large networks. The base stations (denoted eNBs in 3GPP) transmit a reference signal corresponding to the PCID for the mobile stations (denoted UEs in 3GPP) to measure on. The UEs in LTE uses the reference signals to measure e.g. the reference symbol received power (RSRP) and these measurements are used when performing initial cell selection as well as handovers.

When a connected UE detects a strong reference signal this may trigger the UE to report the measurement, along with the corresponding PCID, to the serving eNB. In case the eNB already has a neighbour relation to a cell with the reported PCID the eNB will associate the measurement to the corresponding cell. The eNB might as a result order the UE to perform e.g. a handover to the reported handover candidate target cell.

In case the serving eNB does not recognize the PCID it may order the UE to read and report back the global cell identity (GID) as well as the network identity (i.e. the public land mobile network identity; PLMNID) of the unknown cell. This information is in LTE transmitted on the physical broadcast channel (PBCH). Once the eNB has obtained knowledge of the globally unique identifier, i.e. the combination of GID and PLMNID of the newly detected neighbouring cell it may contact a central server, e.g. a domain name server (DNS) or similar, and obtain the remaining connectivity information it needs to setup a neighbour cell relation with the target cell.

In case the PCID are assigned without manual planning or without an advanced automatic algorithm there is a risk of PCID conflicts. A PCID conflict may be detected if a cell has two neighbours in the NCR list that:
 use the same PCID on the same carrier frequency; and,
 that have the same PLMNID but different GID.

Thus, two cells with conflicting identities need help from a third common neighbouring cell to detect the conflict. As a result, one or both cells must change its old colliding PCID to a non-colliding PCID.

Most of the PCID collisions manifest themselves as ambiguities in NCR lists. However, in case of a small isolated micro cell inside a larger macro cell there may not be any third cell that has both the micro cell and the macro cells as neighbours.

Another case where it is not possible to rely on a third neighbouring cell to detect a PCID conflict is, if there are two isolated cells, e.g. on an island with only two cells.

Yet another case is when there is a "highway deployment" where several cells are aligned along a road such that each cell only has two neighbours.

To be able to detect PCID conflict also in difficult situations as in the examples provided above, the concept of PCID transmission gaps has been introduced. The idea with the PCID transmission gap is to stop transmitting the reference signals corresponding to the PCID at predefined (e.g. pseudo-random) times and to order the connected UEs to try to detect during the gap if any other cell is transmitting reference symbols corresponding to the same PCID. Note, that during normal operation there is in general no need to issue a reference symbol transmission gap. The PCID is a static property of a cell that is initialized when the cell first goes into operation and then that value is typically never changed during the lifetime of the cell. Reference symbol transmission gaps are therefore most useful in newly installed cells that need to verify that the initial PCID is locally non-colliding. Reference symbol transmission gaps could however also be used infrequently (e.g. once a day) to verify that the used PCID is still locally non-colliding. Especially in small micro cells with few neighbouring cells this might be a good safety measure.

Note however, that it is not sufficient to issue reference symbol transmission gaps when there are no, or very few, UEs in the cell, e.g. night time, since this solution must rely on the UEs to measure and detect potential PCID conflicts. Hence the PCID collision detection algorithm using reference symbol transmission gap should preferably be executed during operation hours with normal traffic, e.g. day time.

As mentioned above, transmission gaps of the reference symbols may be used to detect physical cell identity collisions. This is needed e.g. in order for an isolated small micro cell to detect that the PCID is colliding with that of a larger macro cell.

However, if this transmission gap is done by simply avoiding transmission of reference symbols in certain slots or subframes then there are some negative consequences:
 First of all, no data may be transmitted from a cell that issues a reference symbol transmission gap. Also, since the reference symbols are used for calculating the channel estimates needed for coherent demodulation, it is not possible to transmit any control information during the gap, such as uplink grants to the UEs. This may lead to the unwanted side effect that the uplink resource will become unused at a future uplink sub-frame, simply because no UEs are granted to transmit on any uplink resources for that corresponding uplink sub-frame.
 UEs in neighbouring cells performing RSRP measurements on a cell that issues a reference symbol transmission gap will experience reduced measurement accuracy. Since they are not aware of when the non-serving cell will stop transmission of the reference symbols they will observe a sudden drop in unfiltered RSRP measurements. Typically the RSRP measurements are filtered (e.g. a recursive low-pass filtering with forgetting factor $\alpha$) and a sudden noise transient caused by a reference symbol transmission gap may affect the filtered RSRP measurement for a considerable time. This may have a negative affect on the handover performance.
 In case RSRP measurements are used also for e.g. inter-cell interference coordination (ICIC) purposes then the potential gains of such algorithms (and other RRM related algorithms relying on accurate RSRP measurements) may be reduced.

It is problematic for the synchronous HARQ protocols if the associated feedback can not be transmitted from the eNB when the UEs expect to receive it.

In case the reference symbol transmission gap coincides with the transmission of the physical broadcast channel (PBCH) then, since the UEs may not be able to estimate the channel due to the lack of reference symbols, the broadcasted information may not be detectable by all UEs.

It is notable that the negative side-effects listed above will degrade the performance of the system and ultimately also degrade the end user experience.

SUMMARY

It is an objective of the present invention to avoid one or more of these degradations while still enabling detection of PCID collisions.

Accordingly, one objective with the present invention is to provide improved methods, a communication network node and a user equipment for detecting collision of physical cell identities in a communication network system comprising radio base stations each serving at least one cell through which user equipments are moving. Reference signals comprising reference symbols corresponding to a physical cell identity are sent from said radio base stations to said user equipments over a radio interface. Transmission gaps of reference symbols are inserted in the reference signal in order to perform a physical cell identity collision test, during which transmission gaps said user equipments are arranged to detect if any other radio base station is sending reference symbols corresponding to the same physical cell identity and thereby detecting a physical cell identity collision.

According to a first aspect of the present invention this objective is achieved through a method in a communication network node as defined in the characterising portion of claim 1, which specifies that collision of physical cell identities is detected by a method which performs the step of fractionally distributing said reference symbol transmission gaps within said reference signal such that at least some of said reference symbols in said reference signal are unaffected by said reference symbol transmission gaps.

According to a second aspect of the present invention this objective is achieved through a method in a user equipment as defined in the characterising portion of claim 11, which specifies that collision of physical cell identities is detected by a method which performs the steps of: receiving a notification from a communication network node that said physical cell identity collision test is to be performed; searching for a physical cell identity corresponding to said physical cell identity of a serving cell during said reference symbol transmission gaps fractionally distributed within said reference signal such that at least some of said reference symbols in said reference signal are unaffected by said reference symbol transmission gaps; and, if a physical cell identity collision is detected, sending an alarm to said communication network node.

According to a third aspect of the present invention this objective is achieved through a communication network node as defined in the characterizing portion of claim 12, which specifies that collision of physical cell identities is detected by a communication network node which comprises a distributing unit for fractionally distributing said reference symbol transmission gaps within said reference signal such that at least some of said reference symbols in said reference signal are unaffected by said reference symbol transmission gaps.

According to a fourth aspect of the present invention this objective is achieved through a user equipment as defined in the characterizing portion of claim 22, which specifies that collision of physical cell identities is detected by a user equipment which comprises: a receiver for receiving a notification from a communication network node that said physical cell identity collision test is to be performed; a monitoring unit for searching for a physical cell identity corresponding to said physical cell identity of a serving cell during said reference symbol transmission gaps fractionally distributed within said reference signal such that at least some of said reference symbols in said reference signal are unaffected by said reference symbol transmission gaps; and, a transmitter for sending an alarm to said communication network node if a physical cell identity collision is detected.

Further embodiments are listed in the dependent claims.

Thanks to the provision of methods, a communication network node and a user equipment, which introduces the reference symbol transmission gaps according to a pre-defined fractional time-and-frequency pattern, the system performance degradation is kept to an absolute minimum.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
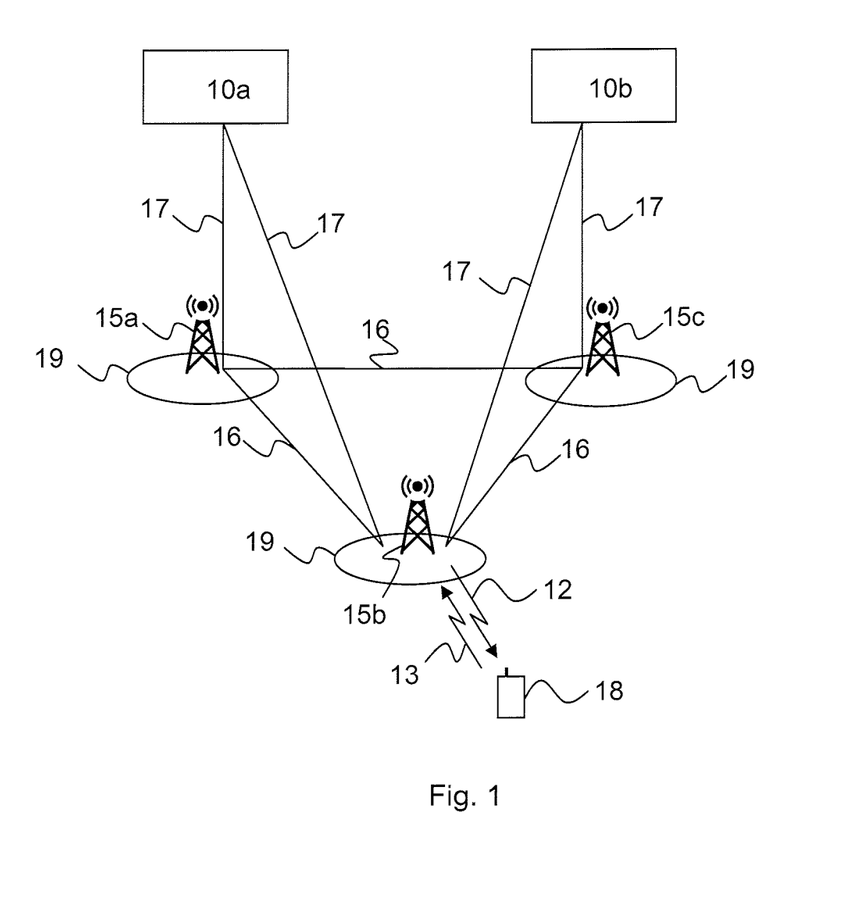
FIG. 1 shows a communication network architecture according to the present invention.

A communication system, such as a Long Term Evolution (LTE) system is shown in FIG. 1, including a Radio Access Network (RAN), comprising at least one Radio Base Station (RBS), which in LTE is called eNode B (eNB) 15a, 15b and 15c. The eNode Bs are connected over an interface such as the S1-interface 17 to at least one server gateway and mobility management entity node (S-GW/MME) 10a and 10b. The S-GW/MME node handles control signalling for instance for mobility, and is connected to external networks (not shown in FIG. 1) such as the Public Switched Telephone Network (PSTN) or the Integrated Services Digital Network (ISDN), and/or a connectionless external network as the Internet.

The RAN provides communication and control for a plurality of user equipments (UE) 18 (only one shown in FIG. 1) and each eNB 15a-15c is serving at least one cell 19 through and in which the UEs 18 are moving. The eNBs 15a-15c are communicating with each other over a communication interface 16, such as X2. The UEs each uses downlink (DL) channels 12 and uplink (UL) channels 13 to communicate with at least one eNB over a radio or air interface.

According to a preferred embodiment of the present invention, the communication system is herein described as a LTE system. The skilled person, however, realizes that the inventive method and arrangement work very well on other communications systems as well. The user equipments may be mobile stations such as mobile telephones ("cellular" telephones) and laptops with mobile termination and thus can be, for example, portable, pocket, hand-held, computer-included or car-mounted mobile devices which communicate voice and/or data with the RAN.

LTE downlink transmission is based on Orthogonal Frequency Division Multiplex (OFDM). The basic LTE downlink physical resource may thus be seen as a time-frequency grid, where each resource element corresponds to one OFDM subcarrier during one OFDM symbol interval.

For LTE, the normal downlink subcarrier spacing has been chosen to $\Delta f=15$ kHz. In addition to the 15 kHz subcarrier spacing, a reduced subcarrier spacing $\Delta f_{low}=7.5$ kHz is also defined for LTE. The remaining discussions within this application will focus on the 15 kHz subcarrier spacing unless explicitly stated otherwise.

In the frequency domain, the downlink subcarriers are grouped into resource blocks, where each resource block consists of twelve consecutive subcarriers. The resource blocks are actually two-dimensional (time/frequency) units with a size of 12 subcarriers times one 0.5 ms slot (7 or 6 OFDM symbols). The LTE physical-layer specification allows for a downlink carrier to consist of any number of resource blocks, ranging from $N_{RB-min}=6$ and upwards.

A subcarrier spacing $\Delta f=15$ kHz corresponds to a useful symbol time $Tu=1/\Delta f\approx66.7$ μs. The overall OFDM symbol time is then the sum of the useful symbol time and the cyclic-prefix length TCP. LTE defines two cyclic-prefix lengths, the normal cyclic prefix and an extended cyclic prefix, corresponding to seven and six OFDM symbols per slot respectively.

Taking into account also the downlink time-domain structure, the resource blocks mentioned above consist of 12 subcarriers during a 0.5 ms slot. Each resource block thus consists of 12.7=84 resource elements in case of normal cyclic prefix and 12.6=72 resource elements in case of extended cyclic prefix. The minimum scheduling unit of LTE is always two resource blocks in consecutive slots, corresponding to one subframe.

As mentioned above, in addition to the 15 kHz subcarrier spacing, a reduced subcarrier spacing $\Delta_{flow}=7.5$ kHz is also defined for LTE and specifically targeting Multicast Broadcast Single Frequency Network (MBSFN) transmission. The use of the reduced subcarrier spacing also scales the OFDM symbol time, including the cyclic-prefix length, by a factor two, thus providing a twice as long cyclic prefix ($\approx33.3$). In the case of the 7.5 kHz subcarrier spacing, the resource block consists of 24 subcarriers, i.e. the resource-block "bandwidth" is still 180 kHz.

The downlink reference signals consist of so-called reference symbols which are known symbols inserted within in the OFDM time/frequency grid. In the LTE downlink there are up to four cell-specific reference signals defined, each corresponding to one downlink antenna port, i.e. antennas visible to the UE.

In case of a single antenna port (a single transmit antenna), a single cell-specific unicast reference signal is inserted into the time/frequency grid. The reference symbols are inserted within the first and the third last OFDM symbol of each slot, see FIG. 2, and with a frequency-domain spacing of six subcarriers and the fifth and fourth OFDM symbol in case of normal and extended cyclic prefix respectively. Furthermore, there is a frequency-domain staggering of three subcarriers between the first and second reference symbols. Within each resource block there is thus a total of four reference symbols.

In case of downlink multi-antenna transmission (transmit diversity and spatial multiplexing) the UE must be able to identify and estimate the channel corresponding of each transmit antenna port. In order to enable this, there is one downlink reference signal transmitted from each antenna port.

In case of two transmit antennas ports, the position of the reference signal of the second antenna port is frequency-shifted 3 subcarriers, relative to the reference signal of the first antenna.

In case of four antenna ports, additional reference signals, corresponding to the third and fourth antennas port, are transmitted within the second OFDM symbol of each slot. Note that this implies that the reference-symbol density on the third and fourth antenna port is lower (one half), compared to that of the first and second antenna port.

In a resource element carrying a reference symbol for a certain antenna port, nothing is being transmitted at the other antenna ports. Thus, there is no interference to reference symbols from other antenna ports within the cell.

Figure 2:
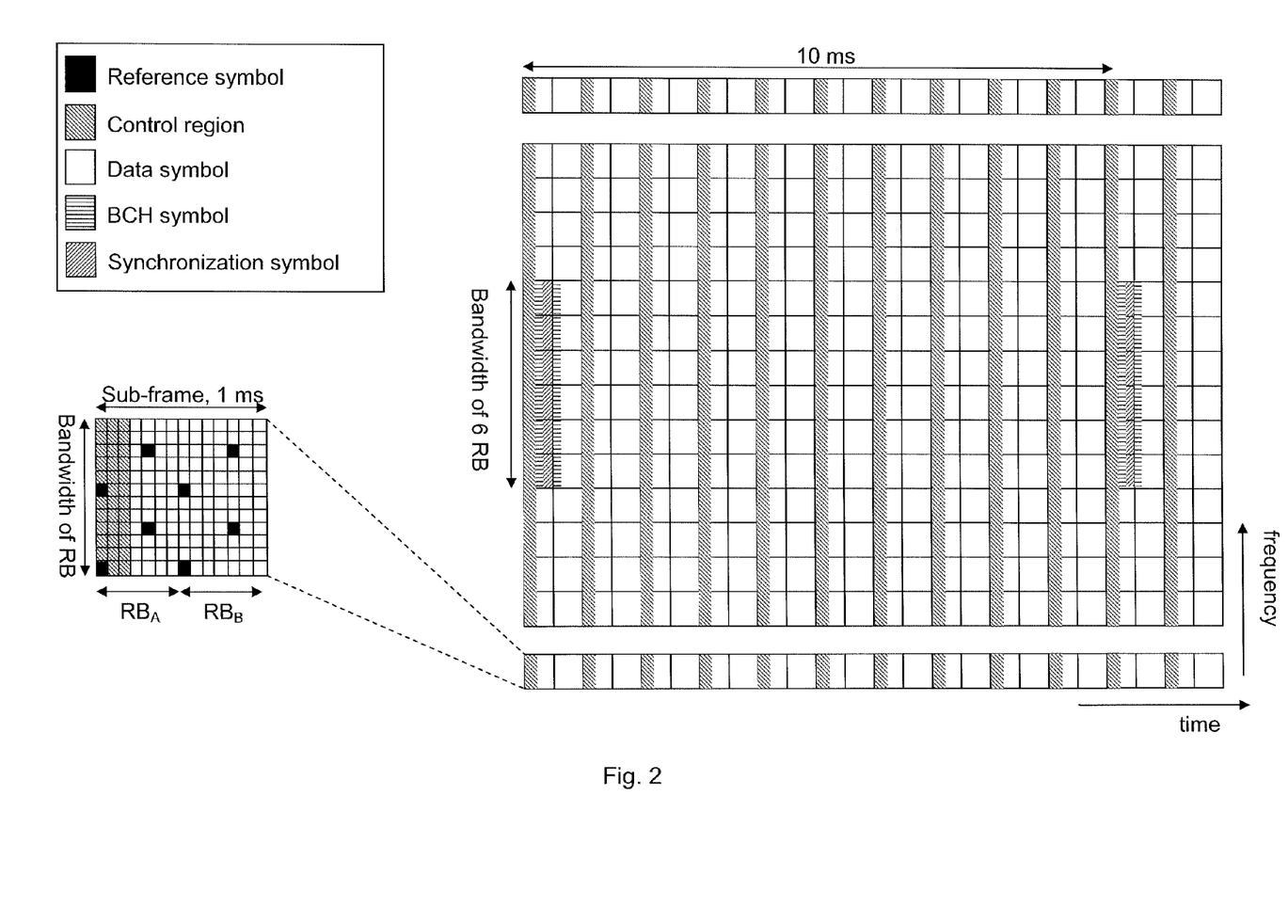
FIG. 2 shows a conceptional view of a reference signal in LTE.
Figure 3:
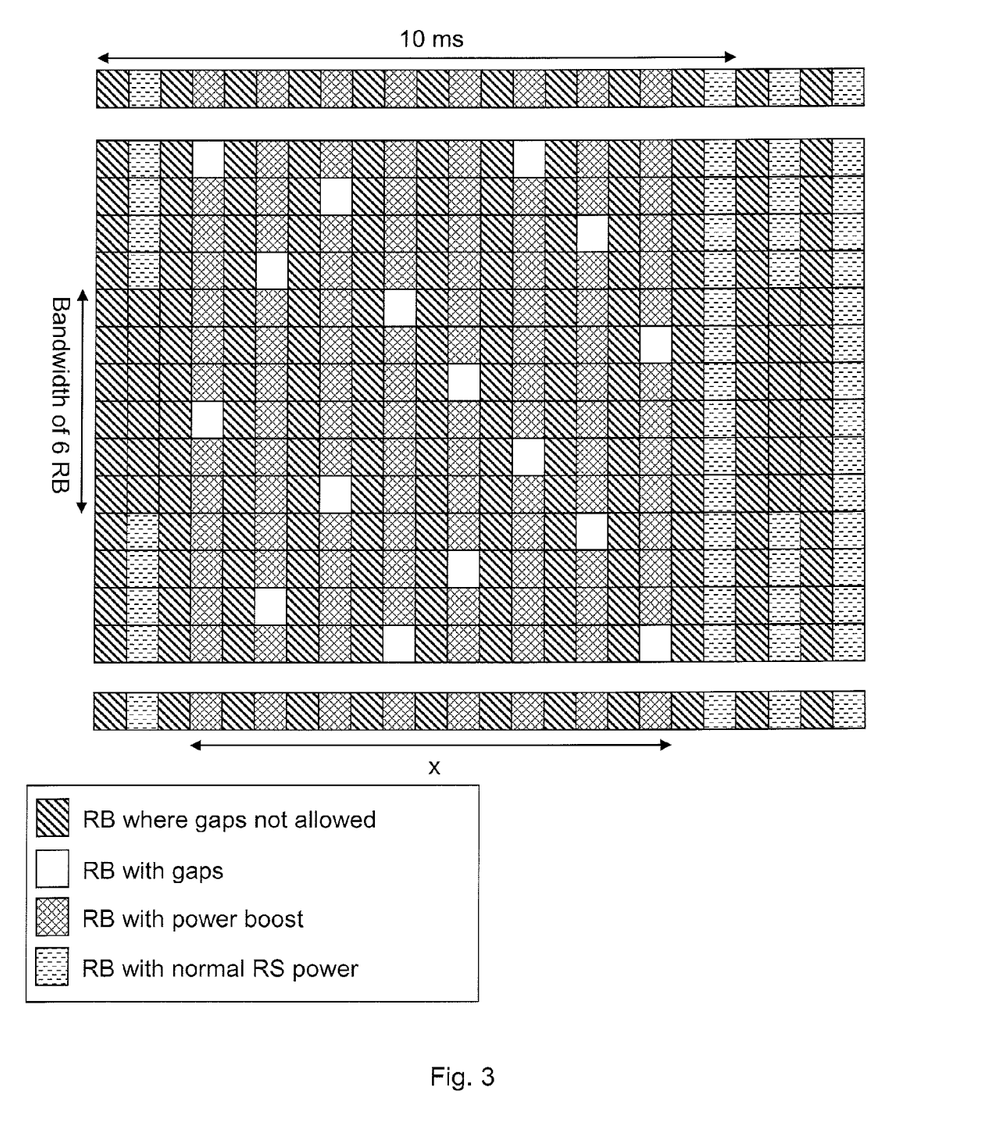
FIG. 3 illustrates a fractional reference symbol transmission gap according to one embodiment of the present invention.

FIG. 2 shows a time and frequency resource block grid for LTE. Each resource block (RB) pair comprises a first resource block $RB_A$ corresponding to a first time slot and a second resource block $RB_B$ corresponding to a second time slot. One sub-frame is illustrated in FIG. 2 being 1 ms. The bandwidth of one RB is 180 kHz.

Reference-Signal Frequency Shifting

The exact position of the reference symbols may be shifted in the frequency domain between different cells. This implies that the frequency-domain positions of the reference symbols may expressed as $$p_k=p_0+6\cdot k \qquad \text{First reference symbols}$$

$$p_k=(p_0+3)\bmod 6+6\cdot k \qquad \text{Second reference symbols}$$

where the cell-specific frequency shift $P_0$ can take values in the range 0 to 5.

The cell-specific frequency shift $p_0$ is directly given by cell identity (Cell ID) group. Thus, as soon as the cell ID group is found as part of the cell search, the frequency shift of the downlink reference signals of that cell is known. For more on Cell ID, Cell ID groups, and cell search.

Reference-Signal Sequences

The actual complex values of different reference symbols are cell specific and directly given by the cell ID.

In case of normal cyclic prefix, the set of reference symbols can be seen as a combination of a (2-dimensional) pseudo-random sequence and a (2-dimensional) orthogonal sequence, where each cell-ID group (168 groups) corresponds to one out of 168 pseudo-random sequence and each of the three cell IDs within each cell ID group corresponds to one out of three orthogonal sequence.

In case of extended cyclic prefix, there is no orthogonal sequence and each cell ID (504 cell IDs) correspond to one out of 504 pseudo-random sequences.

Downlink L1/L2 control signalling is used for transmitting downlink scheduling assignments required for the terminal to properly receive, demodulate and decode the downlink shared channel (DL-SCH), uplink scheduling grants informing the terminal about resources and transport format for uplink shared channel (UL-SCH) transmission, and hybrid-ARQ acknowledgements in response to UL-SCH transmission.

The downlink L1/L2 control channels are mapped to the first (up to three) OFDM symbols within the subframe. Thus, each subframe can be said to be divided into a control region, followed by a data region. The size of the control region is always equal to an integer number of OFDM symbols (1, 2 or 3 OFDM symbols can be used for control signalling) and can be varied per subframe.

In addition to the control-region in each downlink sub-frame, see FIG. 2, the downlink also contains the physical broadcast channel (PBCH). The PBCH is transmitted in sub-frame #0 in every frame. The PBCH is mapped to the centre 6 resource blocks and uses 4 OFDM symbols.

According to the present invention, the reference symbols are turned-off only in the data region in order to avoid affecting the control region of the sub-frame. Thus in the first 1-3 OFDM symbols in each sub-frame the reference symbols are included even when the eNB has issued a reference signal transmission gap. The length of the control region may vary dynamically from sub-frame to sub-frame. If one does not want to dynamically alter in which OFDM symbols during a reference symbol transmission gap where reference symbols are excluded, one could define the gap such that reference symbols are always included in the symbols that could potentially carry L1/L2 control information (i.e. the first three OFDM symbols).

Including reference symbols in the L1/L2 control region also during a reference signal transmission gap enables the eNB to transmit ACK/NACK feedback to the UEs corresponding to uplink transmissions from the UEs. Furthermore, it enables the eNB to continue issuing uplink grants to UEs even during a reference signal transmission gap.

Also, in resource block used to transmit the PBCH the reference symbols may be included during a reference signal transmission gap. This enables UEs to read the broadcast channel during the gap, which is important for many purposes where e.g. the automatic NCR algorithm described above is just one example (the automatic NCR algorithm relies on UEs reading and reporting the GID and the PLMNID that is transmitted on the PBCH of a potentially unknown neighbouring cell).

Furthermore, instead of issuing the reference signal transmission gap only in the time domain a time-and-frequency (hopping) pattern is used and only turn off the reference symbols in one or a few resource blocks (i.e. a small fraction of the resource blocks, significantly less than all). In the remaining resource blocks the power is increased proportionally so that UEs performing wide-band RSRP measurements over the whole carrier bandwidth are not affected. Thus the mobility related measurements performed by UEs in neighbouring cells are unaffected by the reference signal fractional frequency transmission gap. The reference signal power that was not transmitted in a resource block due to the fractional frequency reference signal transmission gap, is (preferably equally) distributed over all remaining resource blocks in the same slot.

In case fractional frequency reference signal transmission gaps is used together with the above mentioned methods of including reference symbols in the control region of the scheduling unit, as well as in resource blocks carrying the PBCH, then care should be taken to ensure that only the reference signal power that was not transmitted due to the reference signal transmission gap is added to the remaining resource block. This will result in that, during a fractional frequency reference signal transmission gap, a somewhat smaller reference power increase will be used in the first slot of each sub-frame (where only reference symbols in the data region are included in the frequency hopping transmission gaps) compared to the second slot of each sub-frame. Also the transmitted reference symbols in sub-frames containing the PBCH will use a smaller power increase during a fractional frequency reference signal transmission gap, compared to the sub-frames without PBCH.

Thus, embodiments herein advantageously insert reference symbol transmission gaps for the purpose of enabling PCID collision detection in a way that keeps the system performance degradation to an absolute minimum. The reference symbol transmission gap is introduced according to a pre-defined fractional time-and-frequency pattern. The transmit power of the remaining reference symbols is increased in proportion in order to keep the totally transmitted reference signal power constant. This power increase assures that UEs in neighboring cells, that performs wide band RSRP measurements on this cell, are not affected. The time-and-frequency pattern of the fractional reference symbol transmission gap is arranged so that the control region in the first half of each sub-frame as well as the physical broadcast channel is unaffected.

UEs served by the cell that issues the reference symbol transmission gap will use the reference symbols to produce frequency dependent channel quality indication (CQI) feedback for channel dependent scheduling. The missing reference symbols might affect the CQI reports. Different approaches can be taken to minimize this effect:

Either one relies that the gap hops around in frequency in a way that minimizes the impact, or one tries to align the resource blocks where the reference symbols are removed with the frequency granularity of the CQI report so that most reported CQI values are not affected at all while a few values might be completely corrupted. Since the eNB knows the location of the resource blocks without reference symbols it can ignore the CQI values for the corresponding resource blocks. A third possibility that the UEs take the time-and-frequency pattern of the reference signal gap into account when calculating the CQI values and thereby assures that the impact on the CQI values is minimized.

In case of higher order modulation the scheduled UEs need to know the power ratio between the reference symbols and the data symbols. If the number of resource blocks that are not transmitting reference symbols is only a small fraction of the total number of resource blocks then the corresponding power boost of the remaining reference symbols will be minor, and the UEs can obtain decent demodulation performance without compensating for this effect. The preferred way, however, is that the UEs calculate by them self a new effective power ratio between reference symbols and data symbols to be used during the fractional reference symbols transmission gap.

The time instances when a cell starts to use reference symbol transmission gaps for PCID collision detection shall be randomized in order to avoid that two cells with colliding PCID synchronously checks for collisions using the same fractional time-and-frequency gap pattern. Typically cells need to check for PCID collisions when they are newly installed and then only occasionally during normal operation. Small cells (e.g. a micro cell with low transmit power) and/or cells with few neighbors should check more often than large cells and/or cells with a large number of neighbors.

The reference symbol transmission gap procedure could be initialized for several reasons:

It could be initialized by an O&M node in the system (such as OSS). The O&M node could regularly perform PCID collision tests in the cells it manages. The decision to do so could be based on a timer, it could be based on the amount of traffic in the cell, it could be based on handover failure reports from other nearby cells etc.

It could be initialized by another cell that proposes this over the X2 or S1 interfaces. The reason may be that several handovers originating in the other cell that was targeted to this cell have failed.

The eNB could initiate this procedure autonomously. This could e.g. be done based on handover failure statistics or that the amount of inter-frequency or inter-RAT handovers is above a threshold.

The actual timing of when a reference symbol transmission gap procedure is initialized could be pseudo-random where the random seed is based on the GID, the MAC-address, or some other unique identity. It could also follow a pre-determined time pattern where the starting time or the phase of the pattern is based on the GID, the MAC-address, or some other unique identity.

When a procedure of reference symbol transmission gaps for PCID collision detection is initiated the UEs need to be notified either on the BCH or by means of dedicated control signaling.

During a reference symbol transmission gap period the UEs in the cell assist to search for potential PCID collisions by searching for the PCID of the serving cell on the resource blocks where the serving cell does not transmit any reference symbols. In case UEs detect the PCID of the serving cell is transmitted on the "empty" resource blocks then a potential PCID collision is detected. The cell may then either send an alarm to the operation and support system (OSS), informing the OSS about the PCID collision and relying on the OSS to resolve the collision. Alternatively the cell may change the old PCID from the old conflicting one to a new, hopefully conflict free PCID, and start over with the PCID collision detection procedure to ensure that the new PCID is indeed conflict free.

The resource blocks where the reference symbols are removed for the purpose of allowing the UEs to detect PICD collisions could follow a pre-determined patter or it could be dynamically indicated on the PDCCH in the same manner as ordinary data is scheduled.

The resource blocks for which no reference symbols are transmitted could be used also for interference estimation in UEs. In these resource blocks the UEs know that the serving cell is not transmitting any reference signal and hence the received power in these resource blocks must all be due to interference and noise.

Figure 4:
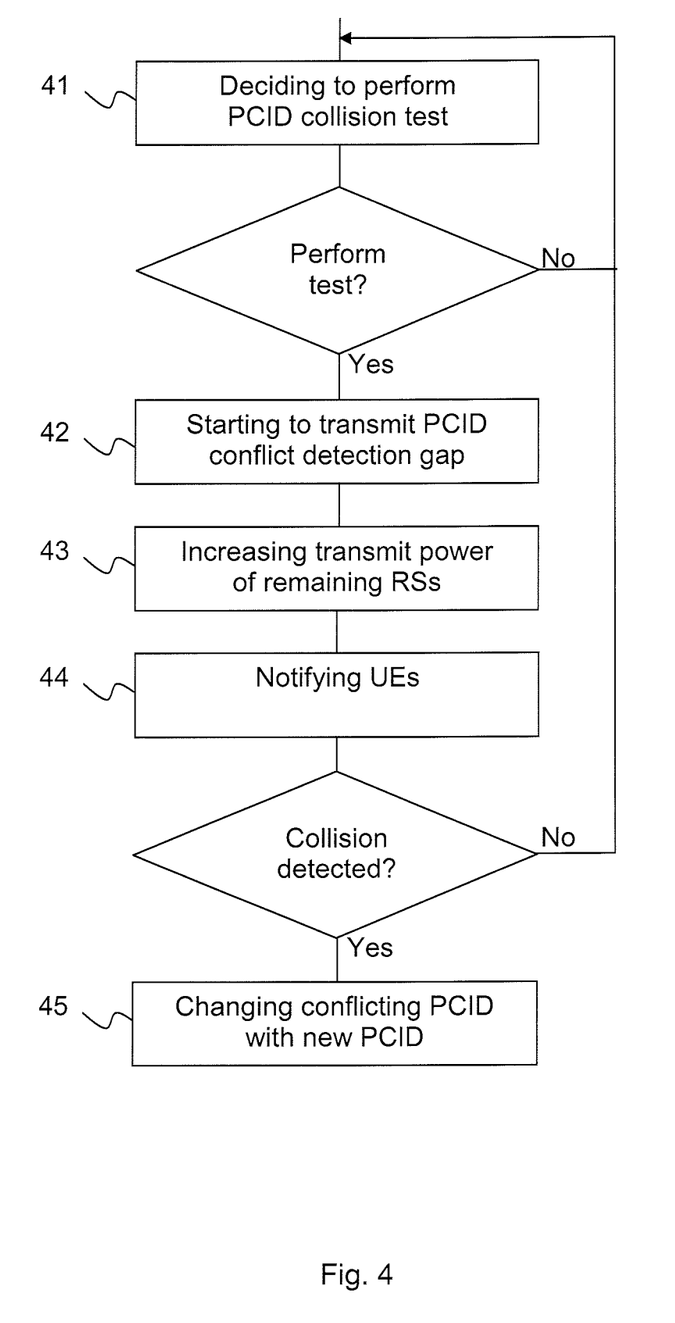
FIG. 4 is a flowchart illustrating the inventive steps performed in a communication network node, such as eNodeB or a OSS.

According to an embodiment of the present invention the procedure, shown in FIG. 4, in a communication network node of detecting collision of physical cell identities in a communication network system comprising radio base stations each serving at least one cell through which user equipments are moving. Reference signals comprising reference symbols corresponding to a physical cell identity are sent from said radio base stations to said user equipments over a radio interface. And, transmission gaps of reference symbols are inserted in the reference signal in order to perform a physical cell identity collision test, during which transmission gaps said user equipments are arranged to detect if any other radio base station is sending reference symbols corresponding to the same physical cell identity and thereby detecting a physical cell identity collision. The reference signal consists of resource block pairs each comprising a first resource block containing a control region and a data region and a second resource block containing a data region. The procedure is as follows:

deciding to perform said physical cell identity collision test (step 41) based on at is least one of the following: a timer; an amount of traffic in said cell; handover failure reports received from neighbouring cells; proposals from another communication network node; handover failure statistics; or, an amount of inter-frequency or inter-RAT handovers is above a threshold value. The timing of when said physical cell identity collision test is initiated is pseudo-random or follows a pre-determined time pattern;

if the test is to be performed, starting to transmit PCID conflict detection signal having reference symbol transmission gaps (step 42) fractionally distributed within said reference signal such that at least some of said reference symbols in said reference signal are unaffected by said reference symbol transmission gaps. The reference symbol transmission gap is distributed according to a fractional time and frequency pattern according to some embodiments of the invention. According to some embodiments, reference symbols is included in said control region of each resource block. And, according to some embodiments when a physical broadcast channel is transmitted in some of said resource blocks, reference symbols is included in resource blocks arranged to transmit said physical broadcast channel according to some embodiments, increasing a transmitted power of remaining reference symbols in order to keep a total transmitted reference signal power constant during a reference symbol transmission gap (step 43);

notifying said user equipments when said physical cell identity collision test is performed (step 44);

if a physical cell identity collision is detected by the UE, changing said conflicting physical cell identity to a new physical cell identity (step 45).

Figure 5:
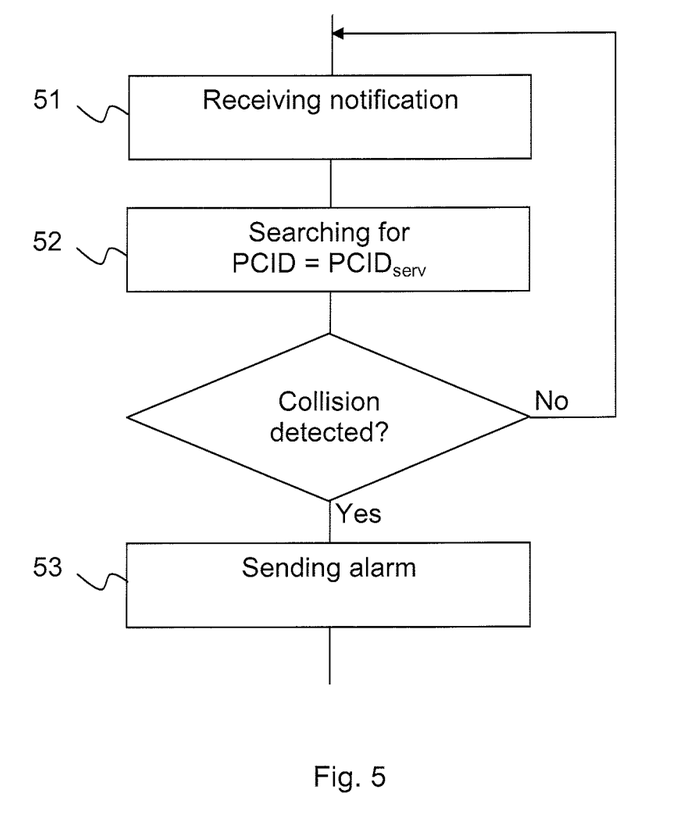
FIG. 5 is a flowchart illustrating the inventive steps performed in a user equipment according to one embodiment of the present invention.

According to an embodiment of the present invention the procedure, shown in FIG. 5, in a user equipment of detecting collision of physical cell identities in a communication network system comprising radio base stations each serving at least one cell through which user equipments are moving. Reference signals comprising reference symbols corresponding to a physical cell identity are sent from said radio base stations to said user equipments over a radio interface. And, transmission gaps of reference symbols are inserted in the reference signal in order to perform a physical cell identity collision test, during which transmission gaps said user equipments are arranged to detect if any other radio base station is sending reference symbols corresponding to the same physical cell identity and thereby detecting a physical cell identity collision. The reference signal consists of resource blocks each comprising a first part containing a control region and a data region and a second part containing a data region. The procedure is as follows:

receiving a notification from a communication network node that said physical cell identity collision test is to be performed (step 51);

searching for a physical cell identity corresponding to said physical cell identity of a serving cell during said reference symbol transmission gaps (step 52), fractionally distributed within said reference signal such that at least some of said reference symbols in said reference signal are unaffected by said reference symbol transmission gaps;

if a physical cell identity collision is detected, sending an alarm to said communication network node (step 53).

Figure 6:
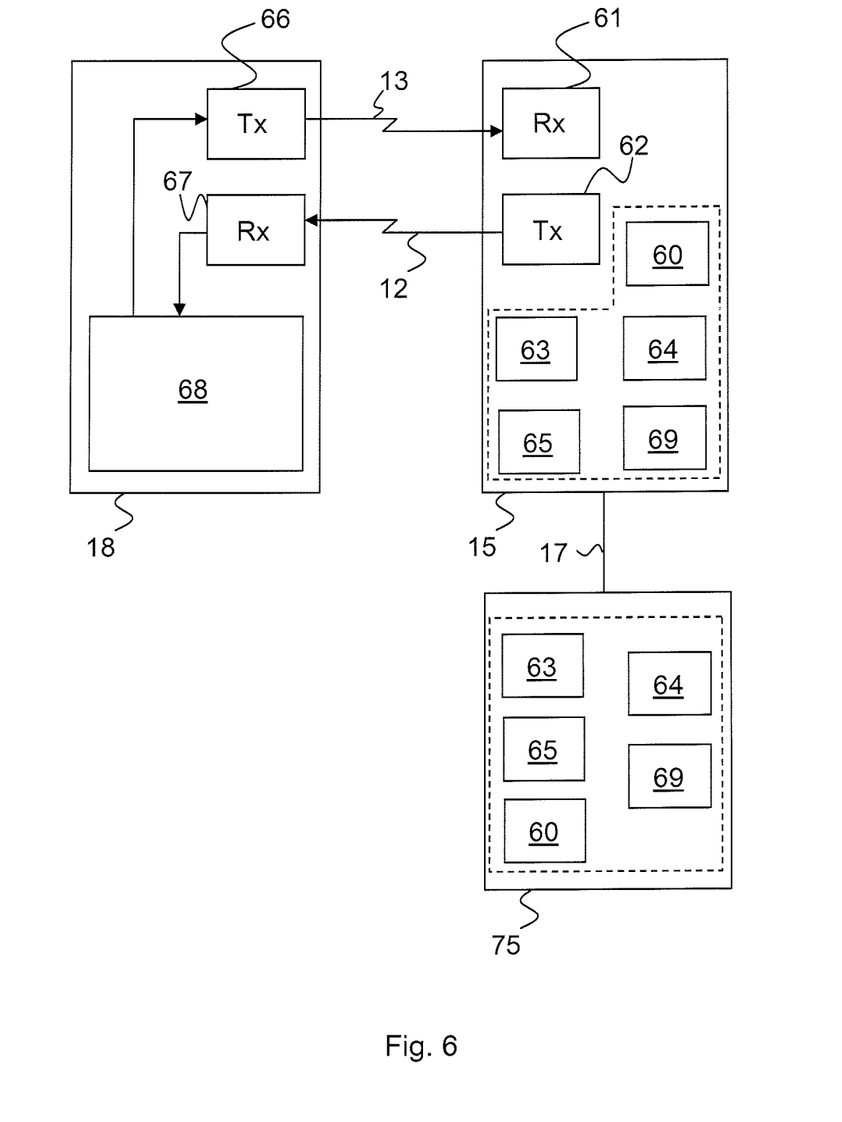
FIG. 6 is an exemplary block diagram of a communication network system.

FIG. 6 is a block diagram showing a user equipment 18, a radio base station (RBS) 15, such as eNode B, and an operating and support system (OSS) 75 for detecting collision of physical cell identities in a communication network system comprising radio base stations each serving at least one cell through which user equipments are moving. Reference signals comprising reference symbols corresponding to a physical cell identity are sent from said radio base stations to said user equipments over a radio interface. And transmission gaps of reference symbols are inserted in the reference signal in order to perform a physical cell identity collision test, during which transmission gaps said user equipments are arranged to detect if any other radio base station is sending reference symbols corresponding to the same physical cell identity and thereby detecting a physical cell identity collision.

The RBS 15 comprises a radio transmitter 62 and a receiver 61. The transmitter 62 is transmitting data to a receiver 67 of the user equipment 18 over a radio interface on the downlink channel 12. The receiver 61 is receiving data from the user equipment 18 on the uplink channel 13. The transmitter 62 of the RBS 15 is arranged to send a notification to the UE 18 when a physical cell identity collision test is to be performed. The RBS 15 further comprises a decision unit 60 deciding when to perform said physical cell identity collision test based on at least one of the following: a timer; an amount of traffic in said cell; handover failure reports received from neighbouring cells; proposals from another communication network node; handover failure statistics; or, an amount of inter-frequency or inter-RAT handovers is above a threshold value The RBS 15 further comprises a distributing unit 63 for fractionally distributing said reference symbol transmission gaps within said reference signal such that at least some of said reference symbols in said reference signal are unaffected by said reference symbol transmission gaps. Optionally, said distributing unit is arranged to distribute reference symbol transmission gap according to a fractional time and frequency pattern.

The reference signal consists of resource blocks each comprising a first part containing a control region and a data region and a second part containing a data region and a physical broadcast channel is transmitted in some of said resource blocks. The RBS further comprises according to some embodiments a signalling unit 64 arranged to include reference symbols in said control region of each resource block and, optionally, arranged to include reference symbols in resource blocks arranged to transmit said physical broadcast channel. Additionally, the RBS 15 comprises a power regulating unit 65 arranged to increase a transmitted power of remaining reference symbols in order to keep a total transmitted reference signal power constant during a reference symbol transmission gap.

The RBS 15 further comprises an identity handling unit 69 arranged, if a physical cell identity collision is detected, to change said conflicting physical cell identity to a new physical cell identity.

The user equipment 18 comprises a radio transmitter 66 arranged to transmit data packets to the receiver 61 of the RBS 15 over the radio interface on the uplink channel 13 and a receiver 67 arranged to receive data packets transmitted from the transmitter 62 of the RBS 15 on the downlink channel 12.

The receiver 67 is further arranged to receive a notification from a communication network node that said physical cell identity collision test is to be performed. The user equipment further comprises a monitoring unit 68 for searching for a physical cell identity corresponding to said physical cell identity of a serving cell during said reference symbol transmission gaps fractionally distributed within said reference signal such that at least some of said reference symbols in said reference signal are unaffected by said reference symbol transmission gaps. The transmitter 66 of the UE 18 is further arranged to send an alarm to said communication network node if a physical cell identity collision is detected.

The OSS 75 is communicating with the RBS 15 via the interface 17 and optionally comprises a decision unit 60 deciding when to perform said physical cell identity collision test based on at least one of the following: a timer; an amount of traffic in said cell; handover failure reports received from neighbouring cells; proposals from another communication network node; handover failure statistics; or, an amount of inter-frequency or inter-RAT handovers is above a threshold value The OSS 75 further comprises a distributing unit 63 for fractionally distributing said reference symbol transmission gaps within said reference signal such that at least some of said reference symbols in said reference signal are unaffected by said reference symbol transmission gaps. Optionally, said distributing unit is arranged to distribute reference symbol transmission gap according to a fractional time and frequency pattern.

The reference signal consists of resource blocks each comprising a first part containing a control region and a data region and a second part containing a data region and a physical broadcast channel is transmitted in some of said resource blocks. The OSS 75 further comprises according to some embodiments a signalling unit 64 arranged to include reference symbols in said control region of each resource block and, optionally, arranged to include reference symbols in resource blocks arranged to transmit said physical broadcast channel. Additionally, the OSS 75 comprises a power regulating unit 65 arranged to increase a transmitted power of remaining reference symbols in order to keep a total transmitted reference signal power constant during a reference symbol transmission gap.

The OSS 75 further comprises an identity handling unit 69 arranged, if a physical cell identity collision is detected, to change said conflicting physical cell identity to a new physical cell identity.

The invention claimed is:

1. A method in a communication network node for detecting a collision between physical cell identities in a communication network system, the communication network system comprising radio base stations, each radio base station configured to serve at least one cell and send a reference signal to user equipments in that at least one cell over a radio interface, the reference signal comprising reference symbols corresponding to a physical cell identity of said at least one cell, the method comprising:

performing, by the communication network node, a physical cell identity collision test by fractionally distributing reference symbol transmission gaps in the time and frequency domains within a given frame of a reference signal to be sent in a cell by a radio base station;

wherein during reference symbol transmission gaps some reference symbols are not sent, to enable user equipments in that cell to detect if another radio base station is sending reference symbols corresponding to the same physical cell identity, while other reference symbols remain unaffected by said reference symbol transmission gaps.

2. The method according to claim 1, wherein fractionally distributing said reference symbol transmission gaps comprises the communication network node distributing the reference symbol transmission gaps according to a fractional time and frequency pattern.

3. The method according to claim 1, further comprising the communication network node starting transmission of a physical cell identity collision detection signal containing said reference symbol transmission gaps.

4. The method according to claim 1, wherein said reference signal comprises resource block pairs, each resource block pair comprising a first resource block containing a control region and a data region, and a second resource block comprising a data region, and wherein during reference symbol transmission gaps at least some of those reference symbols that remain unaffected are included in said control region.

5. The method according to claim 1, wherein said reference signal comprises resource block pairs, each resource block pair comprising a first resource block containing a control region and a data region, and a second resource block comprising a data region, wherein a physical broadcast channel is transmitted in some of said resource blocks, and wherein during reference symbol transmission gaps at least some of those reference symbols that remain unaffected are included in resource blocks that transmit said physical broadcast channel.

6. The method according to claim 1, further comprising the communication network node increasing a transmitted power of those reference symbols that are sent during a reference symbol transmission gap, as compared to when those reference symbols are sent outside of a reference symbol transmission gap, in order to keep a total transmitted reference signal power constant.

7. The method according to claim 1, further comprising the communication network node deciding to perform said physical cell identity collision test based on at least one of the following: a timer; an amount of traffic in said cell; handover failure reports received from neighboring cells; proposals from another communication network node; handover failure statistics; or an amount of inter-frequency or inter-RAT (radio access technology) handovers being above a threshold value.

8. The method according to claim 1, wherein a timing of when said physical cell identity collision test is initiated is pseudo-random or follows a pre-determined time pattern.

9. The method according to claim 1, further comprising the communication network node notifying said user equipments when said physical cell identity collision test is performed.

10. The method according to claim 1, further comprising, if a physical cell identity collision is detected, the communication network node changing said conflicting physical cell identity to a new physical cell identity.

11. A method in a user equipment for detecting a collision of physical cell identities in a communication network system, the communication network system comprising radio base stations, each radio base station configured to serve at least one cell and send a reference signal to user equipments in that at least one cell over a radio interface, the reference signal comprising reference symbols corresponding to a physical cell identity of said at least one cell, and wherein the method comprises:

the user equipment receiving a notification from a communication network node that a physical cell identity collision test is to be performed, for detecting a collision with the physical cell identity of a serving cell;

the user equipment searching for the physical cell identity of the serving cell during reference symbol transmission gaps that are fractionally distributed in the time and frequency domains within a given frame of a reference signal received by the user equipment from the serving cell, wherein during reference symbol transmission gaps some reference symbols are not sent while other reference symbols remain unaffected by said reference symbol transmission gaps; and if a physical cell identity collision is detected, whereby the physical cell identity of the serving cell is found during said reference symbol transmission gaps, the user equipment sending an alarm to said communication network node.

12. A communication network node for detecting a collision of physical cell identities in a communication network system, the communication network system comprising radio base stations, each radio base station configured to serve at least one cell and send a reference signal to user equipments in that at least one cell over a radio interface, the reference signal comprising reference symbols corresponding to a physical cell identity of said at least one cell, the communication network node comprising:

one or more processing circuits configured to perform a physical cell identity collision test by fractionally distributing reference symbol transmission gaps in the time and frequency domains within a given frame of a reference signal to be sent in a cell by a radio base station;

wherein during reference symbol transmission gaps some reference symbols are not sent, to enable user equipments in that cell to detect if another radio base station is sending reference symbols corresponding to the same physical cell identity, while other reference symbols remain unaffected by said reference symbol transmission gaps.

13. The communication network node according to claim 12, wherein said one or more processing circuits are further configured to distribute reference symbol transmission gaps according to a fractional time and frequency pattern.

14. The communication network node according to claim 12, further configured to start transmission of a physical cell identity collision detection signal containing said reference symbol transmission gaps.

15. The communication network node according to claim 12, wherein said reference signal consists of resource block pairs, each resource block pair comprising a first resource block containing a control region and a data region, and a second resource block containing a data region, and wherein the one or more processing circuits are further configured to include at least some of those reference symbols that remain unaffected in said control region during reference symbol transmission gaps.

16. The communication network node according to claim 15, wherein a physical broadcast channel is transmitted in some of said resource blocks, and wherein said one or more processing circuits are further configured to include, during reference symbol transmission gaps, at least some of those reference symbols that remain unaffected in resource blocks that transmit said physical broadcast channel.

17. The communication network node according to claim 12, wherein the one or more processing circuits are further configured to increase a transmitted power of those reference symbols that are sent during a reference symbol transmission gap, as compared to when those reference symbols are sent outside of a reference symbol transmission gap, in order to keep a total transmitted reference signal power constant.

18. The communication network node according to claim 12, wherein the one or more processing circuits are further configured to decide when to perform said physical cell identity collision test based on at least one of the following: a timer; an amount of traffic in said cell; handover failure reports received from neighboring cells; proposals from another communication network node; handover failure statistics; or, an amount of inter-frequency or inter-RAT (radio access technology) handovers being above a threshold value.

19. The communication network node according to claim 12, wherein a timing of when said physical cell identity collision test is initiated is pseudo-random or follows a pre-determined time pattern.

20. The communication network node according to claim 12, configured to notify said user equipments when said physical cell identity collision test is performed.

21. The communication network node according to claim 12, wherein the one or more processing circuits are further configured, if a physical cell identity collision is detected, to change said conflicting physical cell identity to a new physical cell identity.

22. A user equipment configured to detect a collision of physical cell identities in a communication network system, the communication network system comprising radio base stations, each radio base station configured to serve at least one cell and to send a reference signal to user equipments in that at least one cell over a radio interface, wherein a reference signal comprises reference symbols corresponding to a physical cell identity of said at least one cell, and wherein the user equipment comprises:

a receiver configured to receive a notification from a communication network node that a physical cell identity collision test is to be performed, for detecting a collision with the physical cell identity of a serving cell;

one or more processing circuits configured to search for the physical cell identity of the serving cell during reference symbol transmission gaps that are fractionally distributed in the time and frequency domains within a given frame of a reference signal received by the user equipment from the serving cell, wherein during reference symbol transmission gaps some reference symbols are not sent while other reference symbols remain unaffected by said reference symbol transmission gaps; and a transmitter configured to send an alarm to said communication network node if a physical cell identity collision is detected, whereby the physical cell identity of the serving cell is found during said reference symbol transmission gaps.

* * * * *

UNITED STATES PATENT AND TRADEMARK OFFICE
CERTIFICATE OF CORRECTION

PATENT NO. : 8,626,213 B2  
APPLICATION NO. : 13/060381  
DATED : January 7, 2014  
INVENTOR(S) : Frenger et al.

Page 1 of 1

It is certified that error appears in the above-identified patent and that said Letters Patent is hereby corrected as shown below:

On the title page, item (75), under "Inventors", in Column 1, Line 1,
delete "Pal Frenger, Linkoping (SE);" and
insert -- Pål Frenger, Linköping (SE); --, therefor.

On the title page, item (75), under "Inventors", in Column 1, Line 2,
delete "Linkoping" and insert -- Linköping --, therefor.

In the Specification

In Column 5, Line 61, delete "(≈33.3)." and insert -- (≈33.3 µs). --, therefor.

In Column 10, Line 10, delete "at is least" and insert -- at least --, therefor.

Signed and Sealed this
Eighth Day of July, 2014

Michelle K. Lee
*Deputy Director of the United States Patent and Trademark Office*